United States Patent [19]

Davidson et al.

[11] Patent Number: 4,654,706
[45] Date of Patent: Mar. 31, 1987

[54] AUTOMATIC FRONT OF SCREEN ADJUSTMENT, TESTING SYSTEM AND METHOD

[75] Inventors: William H. Davidson, Johnstone; Ian Miller, Lochwinnoch, both of Scotland

[73] Assignee: International Business Machines Corp., Armonk, N.Y.

[21] Appl. No.: 740,376

[22] Filed: Jun. 3, 1985

[51] Int. Cl.⁴ .............................................. H04N 7/18
[52] U.S. Cl. ..................................... 358/139; 358/101; 901/47
[58] Field of Search .......................... 358/139, 10, 101; 901/47

[56] References Cited

U.S. PATENT DOCUMENTS

| | | | |
|---|---|---|---|
| 4,387,394 | 6/1983 | Powell | 358/139 |
| 4,400,731 | 8/1983 | Brown | 358/139 |
| 4,441,120 | 4/1984 | Gerritsen | 358/139 |
| 4,533,950 | 8/1985 | Harshbarger | 358/139 |
| 4,536,792 | 8/1985 | Harshbarger | 358/139 |
| 4,554,663 | 11/1985 | van Cang | 358/139 |
| 4,568,975 | 2/1986 | Harshbarger | 358/139 |

*Primary Examiner*—Howard W. Britton
*Attorney, Agent, or Firm*—John B. Frisone

[57] ABSTRACT

This invention relates to a structure to automatically adjust the image characteristics of a television set or monitor as one of the final steps in a manufacturing process and a method for effecting the adjustments and tests which can be practiced by the structure.

19 Claims, 16 Drawing Figures

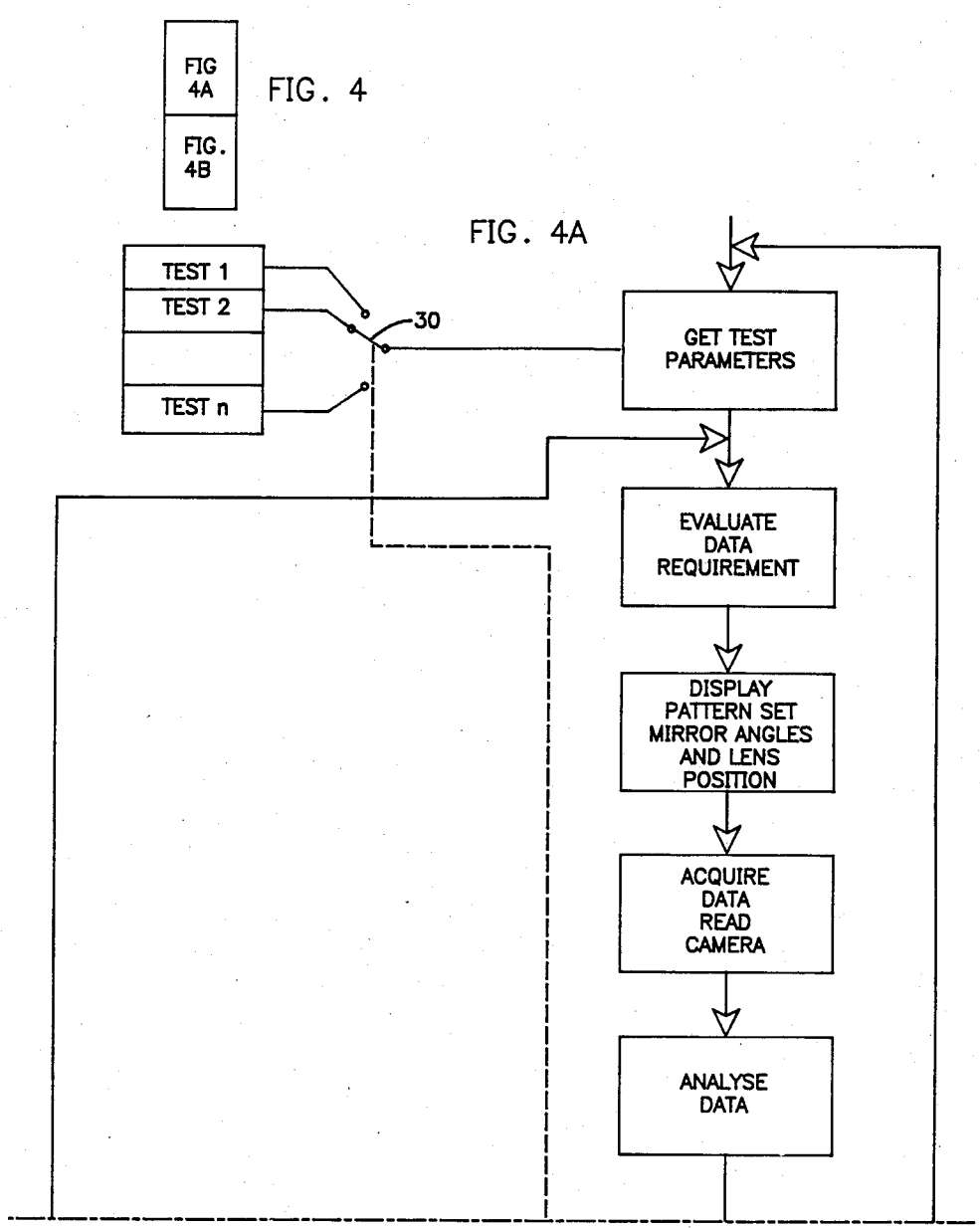

AUTOMATIC FRONT OF SCREEN ADJUSTMENT, TESTING SYSTEM AND METHOD

PRIOR ART

Television sets and television monitors are manufactured from components and sub-assemblies which due to the manufacturing process and tolerances selected to provide economical products result after assembly in a range of image reproductions, many of which would be, from the user's point of view, unsatisfactory. In order to utilize these less than perfect components and sub-assemblies, adjustable circuit elements such as adjustable potentiometers are included in some of the circuits.

After assembly the set is energized and test patterns are applied to the video input. In most instances, the test patterns are distorted due to circuit variations within the tolerances described above. In a typical adjustment an operator utilizes a sequence of images and adjustments in an attempt to obtain a satisfactory (minimum distortion) image.

This technique has two very distinct disadvantages. It is a slow labor intensive activity and therefore contributes substantially to the total cost of the assembly. In the second plate the adjustments result in a broad range of image quality or distortion due to differences in the skill or dedication of the individual making the adjustment.

Attempts have been made to automate some of the steps or part of one or more steps in the adjustment process; however, applicants are not aware of any totally automated process which does not rely in whole or in part on the subjective interpretation by an operator of the efficacy of the adjustments to produce a consistent, acceptable distortion free image.

SUMMARY OF THE INVENTION

The invention contemplates a system for automatically adjusting the operating circuits of a television set or monitor to reduce image distortion to an acceptable level, said system including: a computer for generating a sequence of images for application to the video equipment being adjusted; a scanner for viewing selected portions of the video image on the set under control of signals from the computer and providing signals specifying the image viewed to the computer which generates under program control signals for manipulating a robotic means for adjusting one or more circuit components of the set in accordance with the control signals provided by the computer. Each of the images of the sequence is selected to test for one or more types of image distortion and the scanner is positioned to view selected portions positioned about the screen and provide signals indicative of the viewed image for analysis which analysis indicates a corrective action to robotic circuit adjustment means whereby a sequence of images, measurements and adjustments is utilized to conform the image to an acceptable pattern without human intervention.

An object of the invention is to provide an automated television or monitor image adjustment system which operates without subjective human judgment.

Another object of the invention is to provide a novel method for adjusting the quality of an image provided by a television set or monitor.

A further object of the invention is to provide a novel scanner for use in an automated television or monitor image adjustment system.

The foregoing and other objects, advantages and features of the invention will become more apparent from the detailed description set forth below taken in conjunction with the drawings illustrating the invention.

BRIEF DESCRIPTION OF THE DRAWINGS

FIG. 4, including FIG. 4A and FIG. 4B, is a detailed flow chart illustrating the individual steps in the adjustment/inspection process; and, FIGS. 5–14 illustrate the images displayed on the screen of the monitor being adjusted and tested.

DETAILED DESCRIPTION OF THE INVENTION

Figure 1:
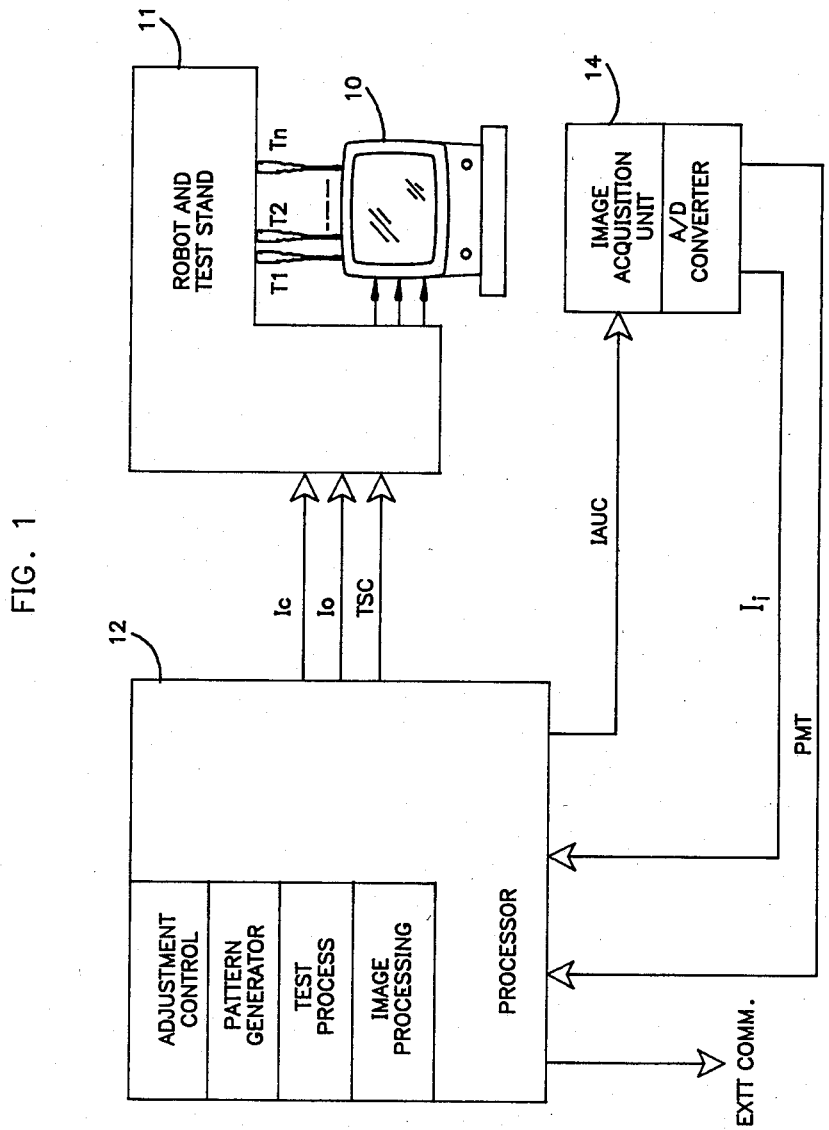
FIG. 1 is a block diagram of an automated television or monitor image adjustment system constructed in accordance with the invention.

In FIG. 1 the set 10 under test and adjustment is connected to a robot and test stand unit 11. Unit 11 is provided with n tools $t_1$-$t_n$ illustrated schematically. Typically, these tools are screw drivers, each of which engages one potentiometer or other adjustable circuit element on the monitor and in response to control signals will perform a rotational adjustment in one of two directions, i.e., increase or decrease the potentiometer resistance depending on the direction chosen. In addition to the tools, the unit 11 provides power to the monitor 10 and video and control signals which it receives from a control processor 12.

The processor 12 is of conventional design and any general purpose digital processor may be utilized to perform the functions described provided the unit has sufficient memory and computational power. As indicated in FIG. 1, the processor has stored in memory (which may include disk storage) image information which is applied to the unit 11 and thence to the monitor 10 via cable Io. The particular image selected is controlled by a test process program also stored in the computer memory. As is the case with the images, only those program steps actually being executed need be stored in the computer read/write memory. The other steps or modules in the case of the program and images in the case of the patterns can be resident in virtual storage on the disk and accessed when and as needed.

An image acquisition unit (IAU) 14 is positioned so as to view the monitor screen and the image displayed thereon. The IAU 14 is shown in greater detail in FIG. 2 and has three controllable elements which respond to control signals from the processor 12 via cable IAUC. These signals are part of the test process and are related to the particular test and/or adjustment related to the specific image being displayed on the monitor screen.

Figure 2:
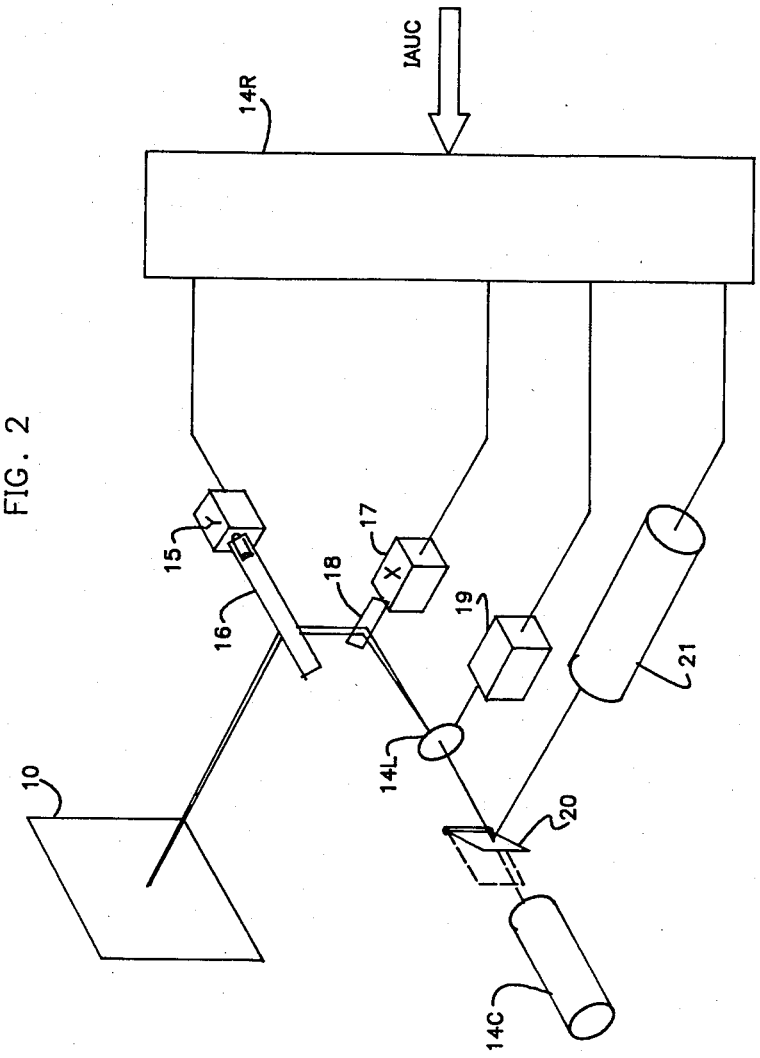
FIG. 2 is a detailed schematic diagram of a novel scanner or image acquisition unit constructed in accordance with the invention.

In response to two of the control signals, the IAU 14 views a small selected portion of the monitor screen and via a camera 14C shown in FIG. 2 provides a digitized image of the small portion viewed over cable Ii. The third signal element provided over the cable IAUC controls a lens system 14L in light path between the screen and the camera. The control of the lens system 14L compensates for the variable distances between the camera and the screen.

These corrections are calculated in advance for each image displayed and viewed. The focus correction described above will differ for each size or type screen being used. If the equipment is to be used for different monitors, the parameters for each can be stored on the disk and the proper ones selected via set-up information keyed into the computer before a production run is initiated. Alternatively, they can be dynamically selected if intermixed production is used. This will require inputting information, identifying the type of screen being adjusted and tested before the test and adjustments are initiated. A simple bar coded label on the monitor or its carrier with an automatic scanning device such as is commonly used in supermarkets can provide the necessary information to the processor automatically when the monitor is first brought into the test and adjustment station. Another technique which would eliminate the scanning operation is to have a pre-programmed sequence and inform the processor in advance of the types and the sequence. While this is more complicated and prone to error, it is nevertheless less expensive to implement.

To this end, FIG. 1 illustrates an external communication line for receiving this type of control information from a central control processor, not shown, and for supplying status information relative to the adjustment and test, i.e., pass/fail information, range of adjustments, etc., all of which may be utilized by the central control processor for executing manual rework of rejected units and/or retuning other elements of the production line.

The digital image information and/or photo multiplier tube (PMT) output from the IAU 14 is applied to an image processing module in the processor 12 for analysis. That is what kind of distortion or deviation is present in the digitized image. Stated differently, what are the differences between the image applied to the monitor 10 and the actual image seen by the IAU camera 14L. Based on these differences, an adjustment control module provides image correction signals via a cable Ic to the robot and test stand 11. These signals, depending on the specific test and the results of the image processing, will control the robot to adjust one or more potentiometers by activating one or more tools t1-tn.

After the adjustments ordered are completed, another view of the image on the screen is received by the image processing module to determine the effectiveness of the adjustment. In those instances where adjustment fails to correct the image, the unit 10 is rejected and a message dispatched to the central control processor which will cause that monitor unit to be switched to a manual rework station further on in the assembly line conveyor.

In FIG. 2 the digital control signals on cable IAUC are converted to analog signals by a control unit 14R and applied to a "Y" axis deflection unit 15 which deflects an elongated mirror 16 so as to view a narrow area extending horizontally from one side of the screen to the other. They are also converted to analog signals which are applied to an "X" axis deflection unit 17 which deflects a mirror 18 so as to view a narrow area on the mirror 16. The composite view as seen on mirror 18 is focused on the camera 14C by the lens system 14L. As previously described, the third signal received from the processor 12 adjusts the focus to take into account the physical location of the viewed area on the monitor screen. As is well known, the monitor screen is not flat, in fact it is convex, and hence the focus varies widely as a function of the displacement of area viewed from the central region of the screen. In addition, the mirror acts as a point collector and as the desired path approaches the edges of the tube, the path length increases as a function of angular displacement from the normal position. However, for any monitor tube the total deviation can be calculated in advance (or dynamically if desired) for each of the areas to be examined and applied as a focus correction factor to the lens 14L via a mechanical control unit 19 under control of the control circuit 14R which provides the necessary digital to analog conversion to provide a suitable signal for the unit 19.

A member 20 positioned between lens 14L and camera 14C, which may take the form of a mirror positioned under control of control circuit 14R can deflect the image to a photo multiplier tube 21 or allow the image to impinge directly on the photo sensitive surface of camera 14C. Alternatively, if sufficient illumination is present, a half silvered mirror may be used and the control unit 14R selects the appropriate output under control of the processor 12.

Figure 3:
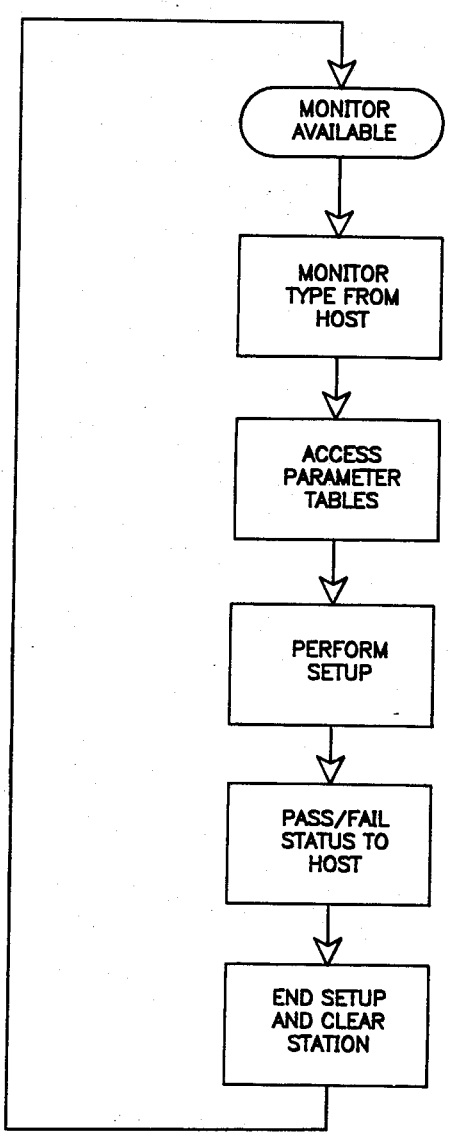
FIG. 3 is a flow chart illustrating the overall system operation.

The flow chart illustrated in FIG. 3 is a high level system chart showing the basic system steps. The test station first detects that a monitor is available and that the processor 12 has received and loaded the monitor type information. Next the parameter tables associated with the identified monitor are accessed. These parameter tables include the required tests, set-up sequences and tolerances, physical characteristics and distortion tables and the focus table. These elements will become more apparent in the description of FIG. 4 which follows.

The following step is the performance of the setup which yields the pass/fail information which is sent to the central processor or host system. The final step is to clear the test station and await the next monitor.

Figure 4B:
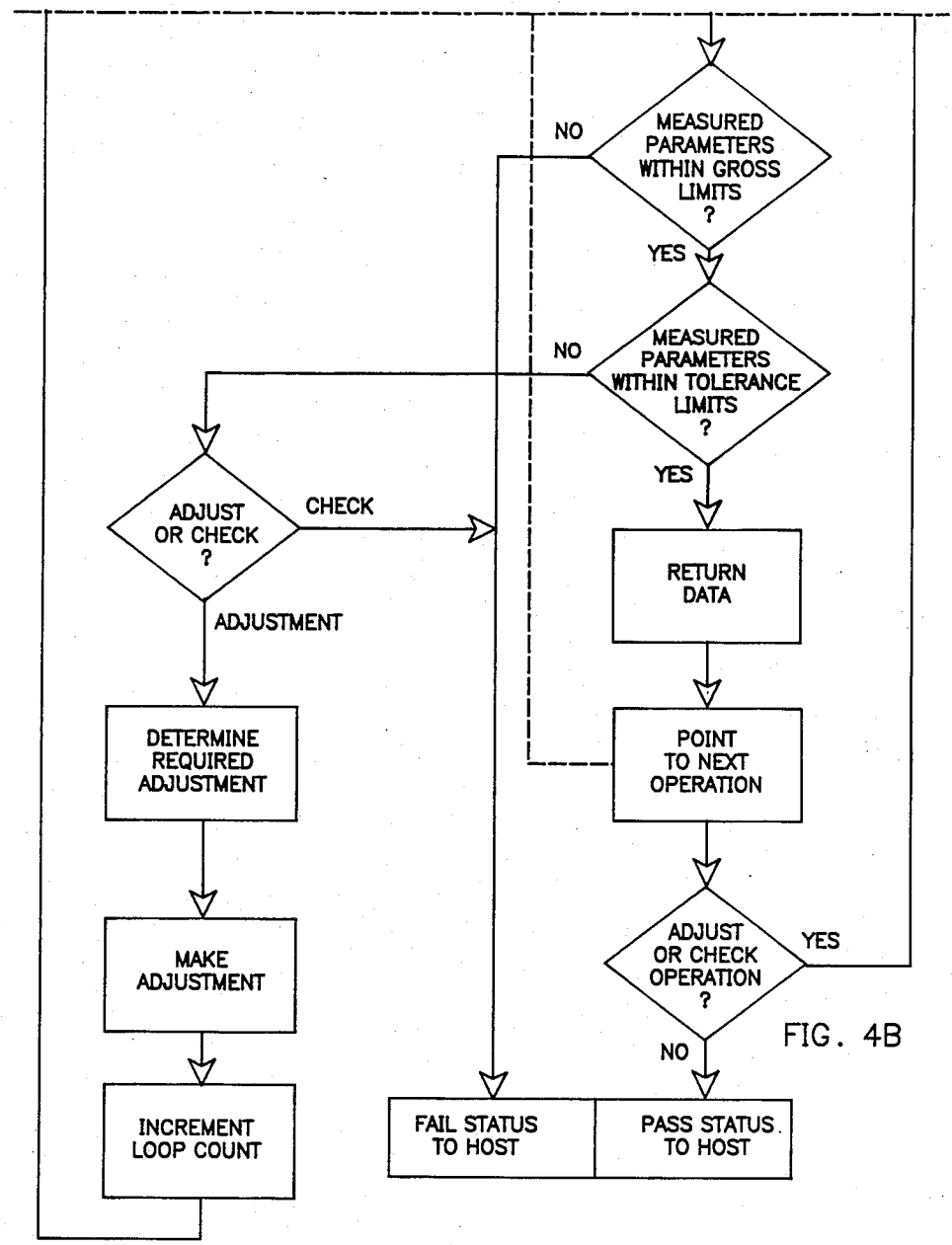

FIG. 4 is a detailed flow chart of all the detailed process steps required to practice the invention and must be viewed in conjunction with FIG. 3 which illustrates the overall process. The test parameters for the monitor resident in the test station are stored in processor memory and are accessed in a predetermined sequence under control of a pointer 30 illustrated schematically which may be, as is well known in computer art, a counter which is incremented, as will be described below, and points to the address in memory where the appropriate test parameters are stored.

The first step in the process is to access the test parameter indicated by the pointer 30. The parameters indicate the data required and the requirements are evaluated. As a result of the evaluation, the necessary pattern (part of the test parameters) is sent to the monitor for display. The mirrors 16 and 18 are adjusted to view the appropriate section of the monitor screen and the lens is adjusted to focus the viewed image area defined by the angular position of mirrors 16 and 18.

At this time the camera is read and the image information acquired and stored in the processor memory. The image data is next analyzed. Following analysis a determination is made if the measured parameters fall within gross limits. Images outside of the gross limits cannot be successfully adjusted and when this is detected, a fail status message is sent to the central processor and the test and adjustment cycle is terminated. If the measured parameters are within the gross limit, they are examined to determine if they are within the tolerance band or limits.

If they are, this phase of the test is completed except for housekeeping functions. The data concerning this test step is collected in a file which is used for off-line analysis of the system at a later time. The pointer 30 which points to the next step or operation is incremented. The next operation is examined to determine if it involves an adjustment or check, if it is one or the other, the process loops back to the first step for the next test. If not, it indicates a completion of the test and adjustment operation and the status is sent to the central processor or host.

In those instances where the measured parameters fall outside of the tolerance band, the step is examined to determine if a check or adjustment is called for. If the step is a check, the unit is failed and status sent to the central host. If, on the other hand, the step calls for an adjustment, the required adjustment is determined from the test parameters and the adjustment made. A loop count which is one of the gross parameters is incremented. Thus, after n unsuccessful attempted adjustments the unit will fail the gross parameter test and thus fail. The process at this, following this adjustment, loops back to recheck the measured parameters.

The routines described above are repeated for all of the adjustments and checks required. The actual number of adjustments and/or checks will vary from one monitor to another and whether the monitor is color or monochrome.

Figure 5:
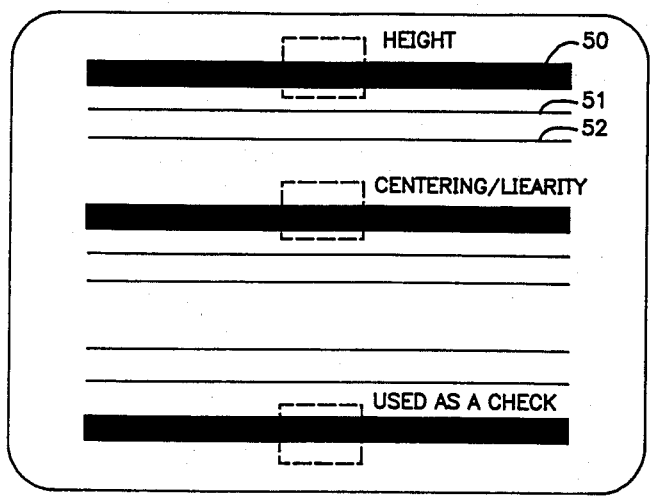
Figure 6:
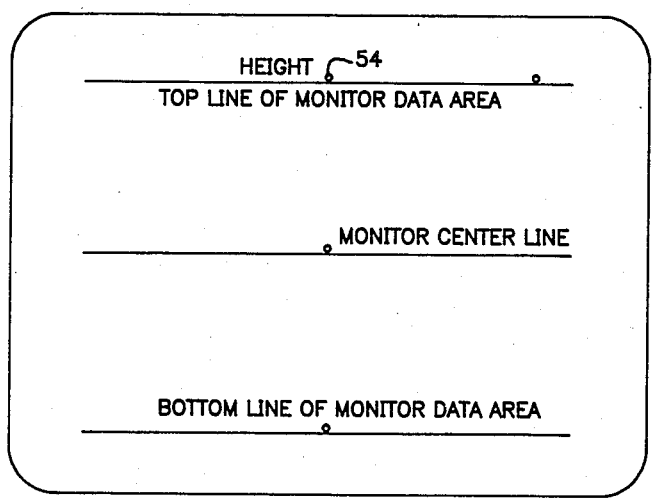

The patterns illustrated in FIGS. 5, 6 an d7 are used in conjunction with the camera or the PMT to adjust vertical parameters. A similar set, not shown, rotated 90° is used to adjust horizontal parameters. Since the vertical and horizontal parameter adjustments are very similar, only the vertical will be considered in detail. The patterns illustrated in FIGS. 8, 9 and 10 are used in conjunction with the camera to check the images for a pass/fail evaluation and are not intended to be used in an adjustment operation.

The dotted line rectangles and the circles illustrated in the illustrations of the patterns indicate various images viewed by the camera and areas viewed by the PMT, respectively. The pattern illustrated in FIG. 5 uses a wide solid bar 50 and two thin solid lines 51 and 52 displaced therefrom at the top of the screen. A similar pattern is displayed at the center of the screen and another pattern in which the thin lines appear above the wide solid line is displayed at the bottom of the screen. The mirrors are adjusted so that, at different times, the camera views the images formed within the rectangles illustrated in dotted line.

Figure 7:
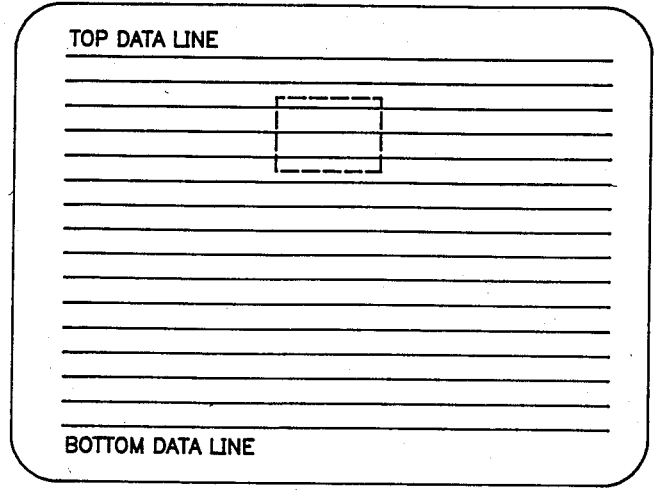

The pattern illustrated in FIG. 6 includes three narrow solid lines at the top center and bottom of the screen. The mirrors are adjusted to cause the PMT to view, at different times, the screen areas identified by the circles 54. The pattern illustrated in FIG. 7 is a series of equidistant parallel narrow solid lines extending from the top to the bottom of the screen. Again the dotted line rectangle indicates an image viewed by the camera.

Figure 8:
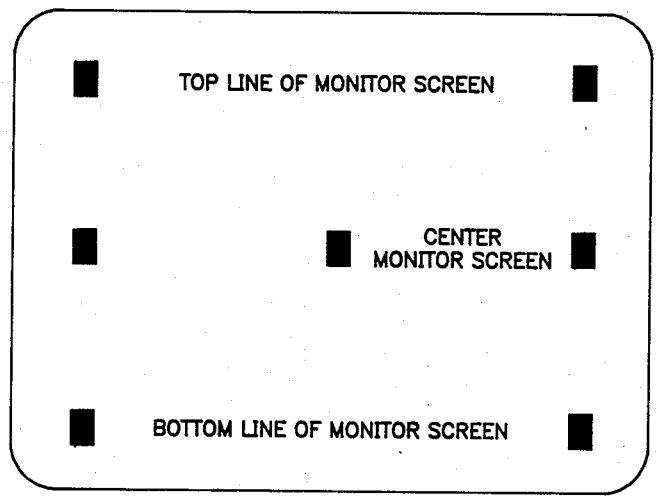
Figure 9:
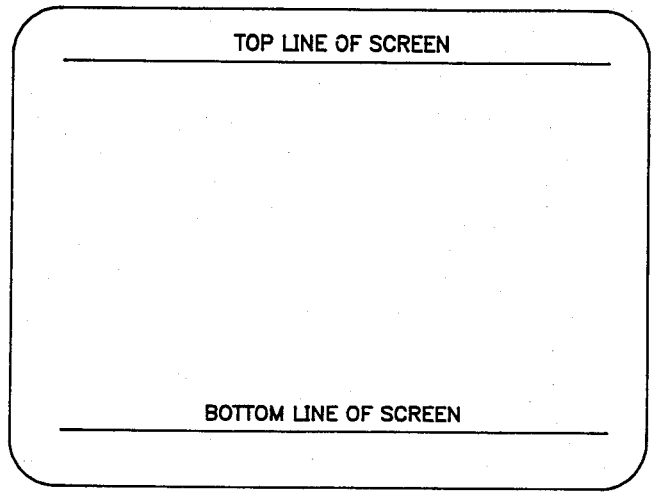
Figure 10:
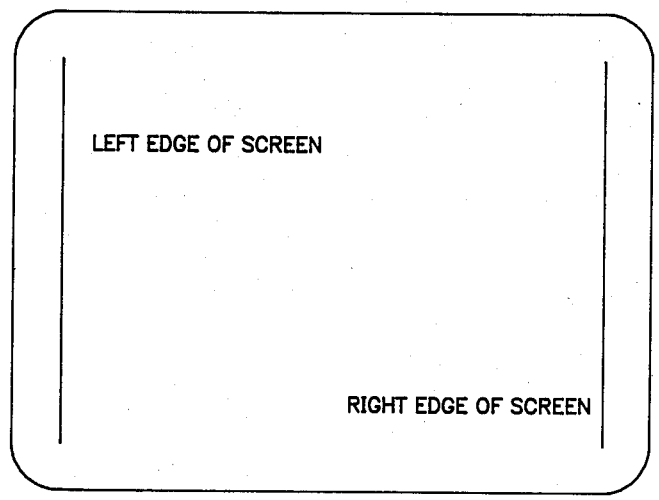

FIGS. 8, 9 and 10 are self-explanatory and illustrate patterns which can be used to check:

row straightness
column straightness
north/south pincushioning*
east/west pincushioning*
trapezoidal distortion
parallelism
convergence
linearity*
centering*

*These may be adjusted using techniques described elsewhere herein.

These patterns and the images provided by the camera and the information from the PMT will be described below in connection with the description of FIGS. 11–14.

The pattern illustrated in FIG. 5 consists of three copies of a basic pattern which includes a fixed solid line, called a primary region, a thin solid line spaced therefrom called a secondary region, and a second thin solid line called a tertiary region. This pattern is replicated three times in FIG. 5 but inverted at the bottom of the screen. The thickness of the bar and the spacing of the thin region is derived empirically from a consideration of the particular monitor characteristics; typically the primary region is one character block thick in the instance of a monitor.

The camera is focused on an area of approximately 1"×1". However, in a model which was constructed an area 1"×0.8" was used, rather than an absolute square. If the monitor parameter being inspected or adjusted is correct, that is, within specification, the primary region would lie in the center of the area viewed by the camera. Depending on whether a primary region, a secondary region or a tertiary region or nothing is viewed by the camera, different actions are taken and will be described below.

If a primary region is found within the field of view, the system attempts to center it using a centroid offset technique. If a secondary or tertiary region is found, the direction of the offset is known and the centroid offset for this region can be calculated. Once calculated, the adjustment is applied in an attempt to bring the primary region to its nominal position. In those instances where no regions are found within the area viewed, the direction of the offset is known. The relevant potentiometer or adjusting device is turned a default amount which has been empirically derived and the area re-inspected. The size of the potentiometer or circuit adjustment determined from empirically derived sensitivities of the front of screen effect to circuit control rotation and the centroid offsets derived therefrom. Areas are used to distinguish regions from each other and region centroids are used to determine how far from normal a parameter is.

Figure 11:
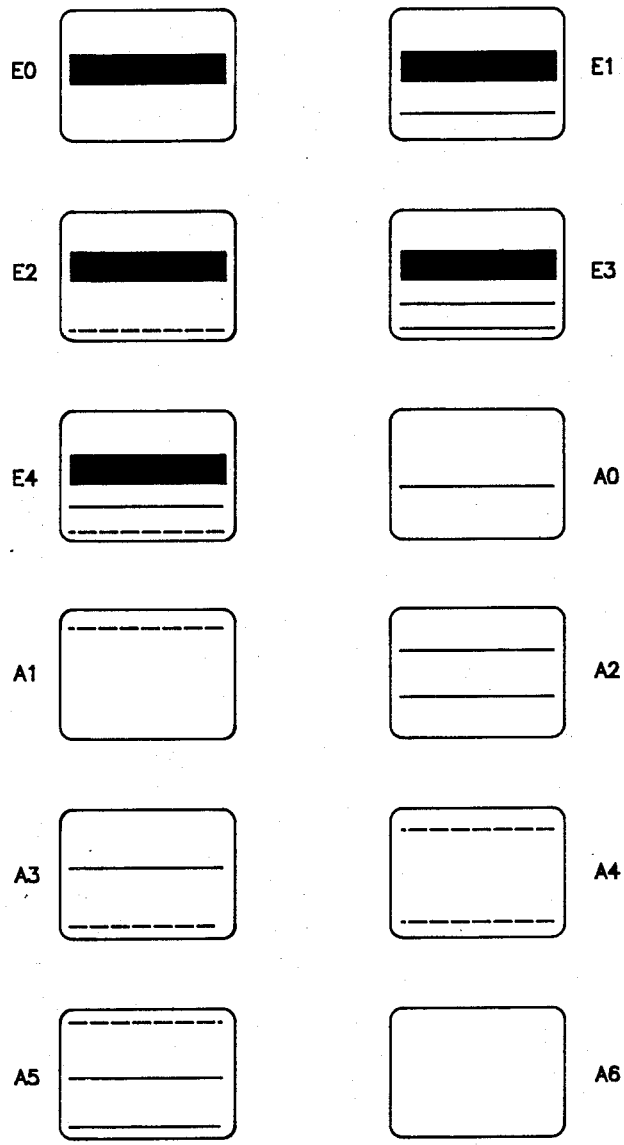

FIG. 11 illustrates twelve different camera images which can result from viewing the pattern illustrated in FIG. 5. These have been labeled E0 to E4 and A0–A6. In these images the dashed lines indicate invalid data, that is, the bar or line is not fully contained (in the illustrated case) vertically within the image area. The twelve images illustrated in FIG. 11 are grouped into two groups. The E group labeled E0 through E4 and the A group labeled A0–A6—in general it is possible to exit from an adjustment if one of the E group of images has been acquired, processed, and the bar satisfies certain conditions. This occurs usually when the E0 image has been acquired. On the other hand, if any of the A group images have been acquired, an adjustment is either required or a fail condition has occurred.

The pattern illustrated in FIG. 5 includes as previously described a thick bar and two thin lines spaced therefrom. The thick bar in the discussion which follows will be identified as a primary region. The immediately adjacent thin line, a secondary region, and the thin line furthest removed from the bar is a tertiary region. Thus, each of the three segments illustrated in FIG. 5 includes the primary, secondary and tertiary region. With respect to images, A0, A2, A3 and A5, the secondary region has been identified with certainty. The offset of the secondary region from its nominal position can thus be determined and a compensating adjustment made or a fail/pass decision can be made if a correction is not effective. In the case of images, A1 and A4, no valid region has been identified and in both cases an assumption is made that the non-valid region closest to the primary region's nominal position is the primary region. The offset from the nominal is determined and an adjustment is performed or a fail/pass decision is made. In the case of A6, the image acquired contains neither valid nor invalid regions and in this case it is assumed that the secondary region is perfectly centered in the image area. An offset is calculated and an adjustment is performed, or a fail/pass decision is made. It should be noted that the sign of the adjustments is opposite to those utilized for images A0 to A3 and A5.

The objective when performing an adjustment is to adjust specific parameters of the primary region. There may also be conditions with respect to the secondary and tertiary regions. These conditions generally involve their absence. The parameter of the primary region which is the significant parameter is the position of centroid of the primary region. The primary objective in processing the E group images is to center the primary region by determining the centroid of the acquired region and its offset from the nominal or centered position, then performing a physical adjustment via the robot to center the primary region within the viewed area of the image.

There are three possible views of the parameter adjustment. The first view is that the parameter is correctly adjusted. This corresponds to a sub-set of the E group of images in which the primary, secondary and tertiary regions satisfy all requirements for that parameter. In most instances this is achieved when the image E0 has been acquired and the primary region has appropriate or correct characteristics. The second state involves where the parameter is not properly adjusted and requires adjustment or setup. This state corresponds to any of the eight groups of images which have been acquired. It also corresponds to any of the E group of images in which the primary, secondary or tertiary regions do not satisfy the requirements of the specification. The third state is where the parameter is in adjustment or has been properly set up but has interaction. This state corresponds to the condition where an adjustment is being performed which has an effect on the state of another parameter. Examples are those of height and vertical linearity. When both of these parameters are correctly adjusted, or set up, an E0 type image with conditions on the primary region is expected. However, in order to successfully decouple the adjustments, linearity must be adjusted first. The state of the height parameter is therefore a variable. This may be translated into the condition that when setting up linearity the only predictable parameter is the position of the primary region, thus no constraints should be placed on the secondary and tertiary regions.

Adjustment techniques based on the PMT output are useful for the parameters which include width, horizontal linearity or alternatively horizontal centering, east/west pincushioning, height, vertical linearity or alternatively vertical centering and north/south pincushioning. When the PMT is used to make adjustments, the adjustment process is considered a closed loop with continuous feedback. That is, the output of the PMT is not a sample output. This eliminates the need for iterations in setting up the parameter. This technique is tolerant of manufacturing errors, thus if potentiometers of incorrect value have been inserted in the particular monitor under test, and the correct front of screen parameters are still achievable, the technique will work with very little cycle time impact. In addition, the technique does not require analysis of large amounts of data such as are contained in an image in order to verify that an adjustment is being performed correctly; therefore, cycle time is essentially independent of the preset of the circuit elements.

There are prerequisites to this adjustment technique. One, the adjustment direction must be known. This direction may be derived from the previously described images. Therefore, the potentiometer or ciruict element can be turned in the correct direction to achieve adjustment. Secondly, the photomultiplier tube must be able to sample a spot having a maximum diameter of 1.0 millimeters at any desired place on the face of the monitor. The structure described is fully capable of accomplishing this.

The adjustment technique involves focusing the photomultiplier tube on the monitor screen at a specific point for a specific parameter adjustment, displaying a line such as those illustrated in FIG. 6 on the monitor, and turning the relevant circuit element until the line lies in the field of view of the photomultiplier tube.

The sequence is as follows: (1) The pattern shown in FIG. 6 is displayed on the monitor. (2) The photomultiplier tube is pointed at and focused on one of the points indicated on the screen for a particular adjustment. (3) The photomultiplier tube output is sensed to detect the presence of light on the sensor, the relevant circuit element or potentiometer is turned to effect the adjustment and (5) when the photomultiplier tube output fires the potentiometer is no longer turned and the adjustment has been completed.

After one of these adjustments has been made, a camera-based technique, as described previously, may be used to check the parameter after adjustment.

Figure 12:
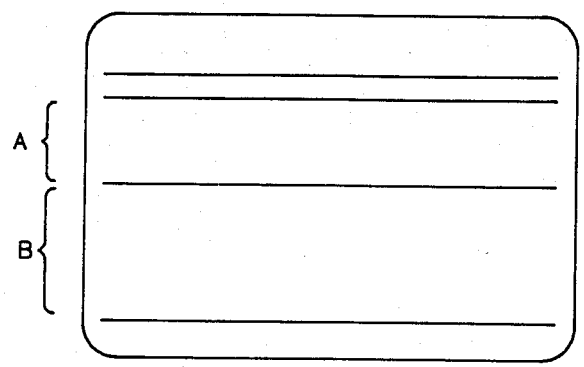
Figure 13:
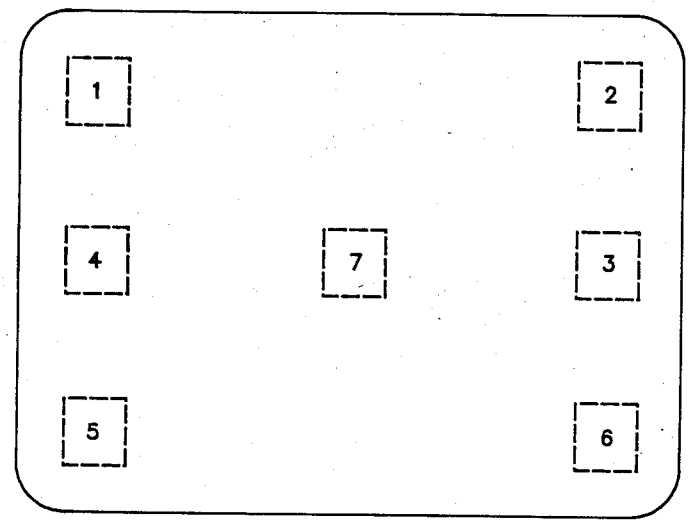

The pattern illustrated in FIG. 7 may be utilized for adjusting the linearity of the monitor under adjustment and test and the image provided by the camera when viewing the pattern of FIG. 7 is illustrated in FIG. 12. In this instance the linearity potentiometer is adjusted until the distance between any of the three lines illustrated in FIG. 12 is within linearity specifications and larger than an empirically derived minimum. The pattern and line spacings are derived from considerations of the adjustment characteristics of each monitor type. The direction of the adjustment is derived from a comparison of the distances A and B identified in FIG. 12. If A is larger than B, then the adjustment is in one direction. If B is larger than A, the adjustment is in the opposite direction. The size of the adjustment is derived from a consideration of the ratio of A and B.

Figure 14:
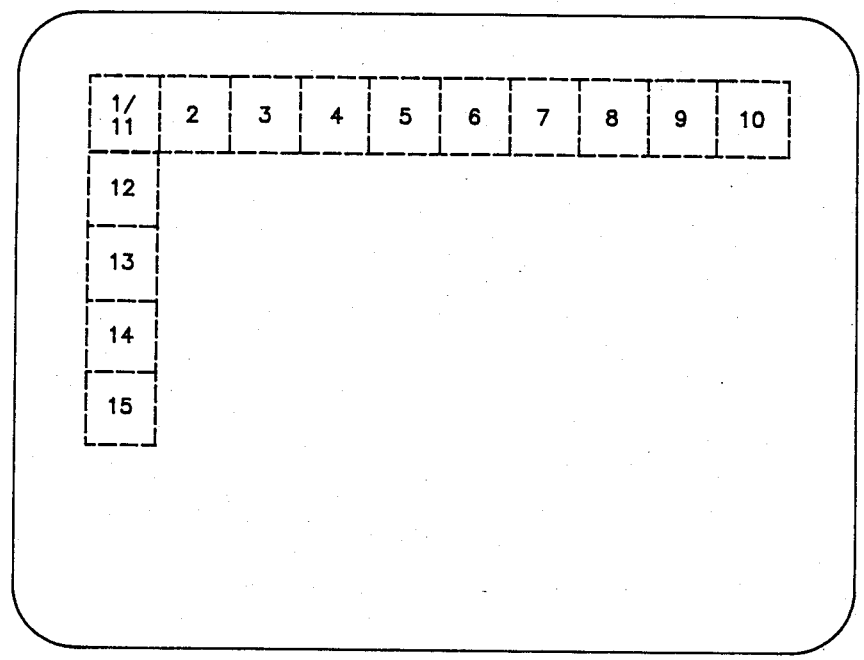

The pattern illustrated in FIG. 8 has several uses. The different areas viewed are identified by numerals in FIG. 13 while FIG. 14 illustrates the use of the patterns shown in FIGS. 9 and 10. All of these are used for checking the monitor to determine whether or not the image quality meets the specifications set for a particular monitor.

The patterns and images are used in the following way. The first check utilizes the images illustrated in FIG. 13. The first parameter checked is image tilt. This utilizes images number 3 and 4 and determines the centroid offset in one axis and hence the angle of tilt. The check for trapezoidal distortion uses images 1, 2, 5 and 6 and measures the centroid of the illuminated area to determine trapezoidal distortion. Using a similar technique, parallelism is checked by using images 1, 2, 5 and 6. Centering of the images is checked by using image number 7 and computes the XY centroid offset of the illuminated area. Convergence of the color images is also checked by using some or all of the images available. This check requires the pattern being displayed sequentially in each of the three primary colors, then the centroids of each of the color images are compared for deviation.

A second set of checks utilizes the images illustrated in FIG. 14. These images are numbered 1-15 and one of the images in the upper left-hand corner bears two numbers. Images 1-10 are acquired when the pattern illustrated in FIG. 9 is displayed and images 11-15 are acquired when the pattern illustrated in FIG. 10 is displayed.

North/south pincushioning check uses images 1, 5 and 10. The offset between the centroids of these images in one axis indicates the amount of pincushioning present in the north/south direction. Row straightness uses images 1-10. This test utilizes the deviation of the centroids of the images in the range of 1-10.

Images 11, 13 and 15 are used to check east/west pincushioning and the offset between the centroids of these images in one axis indicates the amount of pincushioning present in the east/west direction. Column straightness is checked by using images 11-15. This check is very much similar to that used for row straightness, described above.

The order in which the front of screen adjustments occur may differ slightly from one monitor or TV set to another. However, the following sequence has been found to be particularly useful: (1) preset contrast, (2) set brightness, (3) set horizontal centering, (4) set vertical parameters, (4A) linearity, (4B) centering, (4C) height, (5) set horizontal parameters, (5A) width, (5B) pincushioning, (6) set brightness, (7) check parameters. The checks may be performed in any sequence.

While a single embodiment of the invention has been shown and described in detail, it will be obvious to those skilled in the art that many changes and modifications may be made without departing from the spirit and scope of the invention.

Having thus described our invention, what we claim and desire to secure as Letters Patent is as follows:

1. In an automatic front of screen adjustment and testing system for automatically adjusting and testing a television monitor an image acquisition unit comprising:
    first means responsive to first positioning signals for viewing a monitor screen and forming an image of a substantially rectangular portion of the screen corresponding to the first positioning signals, said substantially rectangular portion being substantially less than the total area of the monitor screen;
    second means for viewing the image formed on said first means and converting said image to electric signals corresponding thereto; and,
    third means interposed between said first and second means and responsive to second signal for adjusting the optical path length between the second means and the monitor screen to compensate for path variations which are dependent on the area on the monitor screen which is being viewed by the third means.

2. An image acquisition unit as set forth in claim 1 in which said first means comprises:
    first positionable means for selectively viewing a narrow rectangular area on the monitor screen extending between opposite sides of the monitor screen and forming an optical image thereof;
    second positionable means for selectively viewing a narrow rectangular area of the image formed by the said first positionable means.

3. An image acquisition unit as set forth in claim 2 in which said third means comprises:
    an adjustable lens system for focusing the image formed on the said first means at the said second means.

4. An image acquisition unit as set forth in claim 1 in which said second means comprises:
    a video camera for viewing the image formed at the said first means and providing an electric signal representative thereof;
    a narrow aperture light detecting means for viewing a small area of the image formed at the said first means and providing electric signals indicative of the presence of light at the small area viewed; and,
    switching means responsive to third electric control signal for providing signals from the said camera or the said light detecting means.

5. An image acquisition unit as set forth in claim 1 in which:
    said first means comprises;
        a first positionable means for selectively viewing a narrow rectangular area on the monitor screen extending between opposite edges of the monitor screen and forming an optical image thereof,
        a second positionable means for selectively viewing a narrow rectangular area of the image formed by the said first positionable means and forming an optical image thereof,
    said third means comprises;
        an adjustable lens system for focusing the image formed on the first means at the said second means, and
    said second means comprises;
        a video camera for viewing the image formed on said second positionable means and providing electric signals representative thereof,
        an aperture light detecting means for viewing a small area of the image formed on said second positionable means and providing electric signals indicative of the light intensity of the area viewed, and switching means responsive to a third electric control signal for selectively providing signals from said camera and said light detecting means as a function of the state of the third control signal.

6. An image acquisition unit as set forth in claim 5 in which the narrow aperture light detecting means is a photo multiplier tube.

7. An image acquisition unit as set forth in claim 5 in which the switching means is a mirror controllable to one of two positions and which in one position reflects the light emanating from the first means and in its other position is out of the light path and said camera is positioned in one path and the light detecting means is positioned in the other path.

8. An image acquisition unit as set forth in claim 5 in which the switching means comprises:

a beam splitter positioned in the optical path from the first means for dividing the light into a first path and a second path and directing the light in the two paths to the camera and light detector respectively; and electric switch means for selecting the electric signals from the camera or light detector in response to said third electric control signal.

9. An image acquisition unit as set forth in claim 5 in which:

said first positionable means includes;

a first mirror mounted for rotation on a first motor, the angular rotation of which is controlled by a first component of said first positioning signals, said first mirror being arranged to view a narrow area approximately 1" wide extending horizontally across the monitor screen and progressing from the top edge to the bottom edge of the screen as the motor undergoes angular rotation, and said second positionable means includes;

a second mirror mounted for rotation on a second motor, the angular rotation of which is controlled by a second component of said first positioning signals, said second mirror being arranged to view a narrow area approximately 1" wide extending vertically across the said first mirror whereby a rectangular image of a small portion of the monitor screen is present on the said second mirror.

10. An automatic front of screen adjustment and testing system for automatically adjusting and testing a television monitor comprising:

a robotic test stand for receiving and holding the monitor being adjusted and tested, said stand including a plurality of tools for engaging adjustable electric circuit components of the monitor, and adjusting said components under control of control signals, a power supply for energizing the monitor, and circuits for applying control signals to said tools and video signals to the video input of the monitor resident in the test stand;

an image acquisition unit positioned proximate the monitor in the stand, said unit including, first means responsive to first positioning signals for viewing and forming an image of a substantially rectangular portion of the monitor screen corresponding to the first positioning signals, said portion being substantially less than the total area of the monitor screen, second means for viewing the image formed on said first means and for converting said image to electric signals corresponding thereto, and third means interposed between said first and second means and responsive to second signals for focusing the image formed on the first means on the second means to compensate for variations in the optical path length which are dependent on the area on the monitor screen being viewed; and a program controlled processor connected to said robotic test stand and to said image acquisition unit for sending video test patterns in the form of video signals and control signals to said robotic test stand and for receiving the electric signals from the second means of the said image acquisition unit, said program controlled processor alternatively providing video and control signals to said robotic test stand and receiving signals from said image acquisition unit until the signals from said image acquisition unit and the video signals supplied to the robotic test stand for application to the monitor bear a predetermined relationship to each other or "n" iterative cyles have occurred without achieving the predetermined relationship.

11. The testing system set forth in claim 10 in which said first means responsive to first positioning signals includes:

a first positionable means for selectively viewing a narrow rectangular area on the monitor screen extending between opposite edges of the monitor screen and forming an optical image thereof;

a second positionable means for selectively viewing a narrow rectangular area of the image formed by the said first positionable means.

12. The testing system set forth in claim 10 in which said third means interposed between the first and second means includes;

an adjustable lens system for focusing the image formed by the said first means at the said second means.

13. The testing system set forth in claim 10 in which said second means for providing electric signals corresponding to the image formed by the first means includes:

a video camera for viewing the image formed at the said first means and providing an electric signal representative thereof;

a narrow aperture light detecting means for viewing a small area of the image formed at the said first means and providing electric signals indicative of the presence of light at the small area viewed; and, switching means responsive to third electric control signal for providing signals from the said camera or the said light detecting means.

14. An automatic front of screen adjustment and testing system for automatically adjusting and testing a television monitor comprising:

a robotic test stand for receiving and holding the monitor being adjusted and tested, said stand including a plurality of tools for engaging adjustable electric circuit components of the monitor, and adjusting said components under control of control signals, a power supply for energizing the monitor, and circuits for applying control signals to said tools and video signals to the video input of the monitor resident in the test stand;

an image acquisition unit positioned proximate the monitor in the stand, said unit including, a first positionable means for selectively viewing, in response to a first electric control signal, a narrow rectangular area on the monitor screen extending between opposite edges of the monitor screen and forming an optical image thereof, a second positionable means for selectively viewing, in response to a second control signal, a narrow rectangular area of the image formed by the said first positionable means and forming an optical image thereof, a video camera for viewing the image formed on said second positionable means and providing electric signals representative thereof, light detecting means arranged to view a small area of the image formed on said second positionable means and providing electric signals indicative of the light intensity of the viewed area, and switching means responsive to a third electric control signal for selectively providing signals from said camera and said light detecting means as a function of the state of the third control signal, an adjustable lens system for focusing the image formed on the second positionable means on the camera and the light detecting means in response to a fourth electric control signal; and a program controlled processor connected to said robotic test stand and to said image acquisition unit for sending video test patterns in the form of video signals and control signals to said robotic test stand and control signals to said image acquisition unit and for receiving the electric signals from the camera or light detector of the image acquisition unit, said program controlled processsor alternatively providing video and control signals to said robotic test stand and receiving signals from said image acquisition unit until the signals from said image acquisition unit and the video signals supplied to the robotic test stand for application to the monitor bear a predetermined relationship to each other or "n" iterative cycles have occurred without achieving the predetermined relationship.

15. A method of adjusting the image control circuits of a television monitor comprising the steps of:
 (1) displaying a predetermined image on the screen the TV monitor to be adjusted;
 (2) defining a plurality of unique areas on the monitor screen, each said area covering a small portion of the monitor screen;
 (3) viewing a first predetermined selected area of the monitor screen;
 (4) analyzing the image viewed in the said first area to determine the deviation of the viewed image from a predefined image;
 (5) adjusting at least one image control circuit element as a function of the results of the analysis;
 (6) repeating steps 2, 3 and 4 until the deviation of the viewed image from the predefined image falls within acceptable preset limits provided the occurrence of said event does not exceed a set number of repetitions of this step 5; and,
 (7) viewing at least one additional unique area and for each said additional unique area viewed repeating steps 2, 3 4 and 5 as set forth above.

16. The method set forth in claim 15 in which each small area is approximately one square inch.

17. The method set forth in claim 16 in which the image displayed on the monitor screen includes a thick bar and two thin lines displaced therefrom and the analysis determines the displacement of the bar from the center of the viewed area.

18. The method set forth in claim 16 in which the image displayed on the monitor screen is a plurality of parallel lines and the analysis determines the displacement between a line and adjacent lines on either side of the said line.

19. A method of adjusting the image control circuits of a television monitor comprising the steps of:
 (1) displaying a predetermined image on the screen of the TV monitor to be adjusted;
 (2) viewing at least one area having a diameter of 1 milimeter or less on the monitor screen; and generating a signal indicative of the illuminated state of the monitor screen;
 (3) continuously adjusting a predetermined circuit element in the monitor until the viewed area of the monitor screen is illuminated; and
 (4) selecting another area and repeating steps 1 to 3 as required for adjusting all of the required circuit elements.

* * * * *